E. YEISER.
Fifth-Wheel for Carriages.
No. 81,452.
Patented Aug 25, 1868.
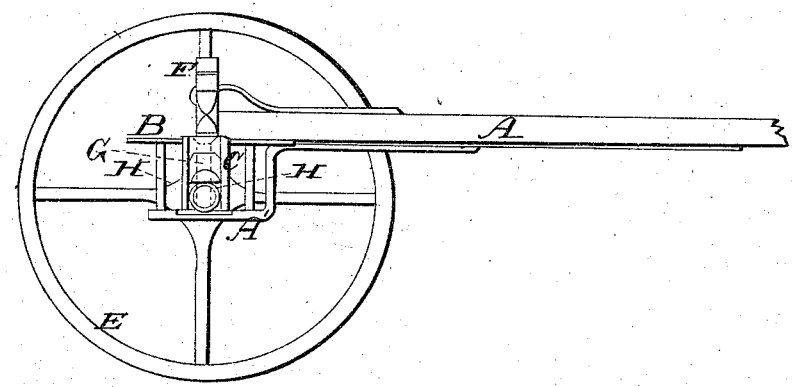
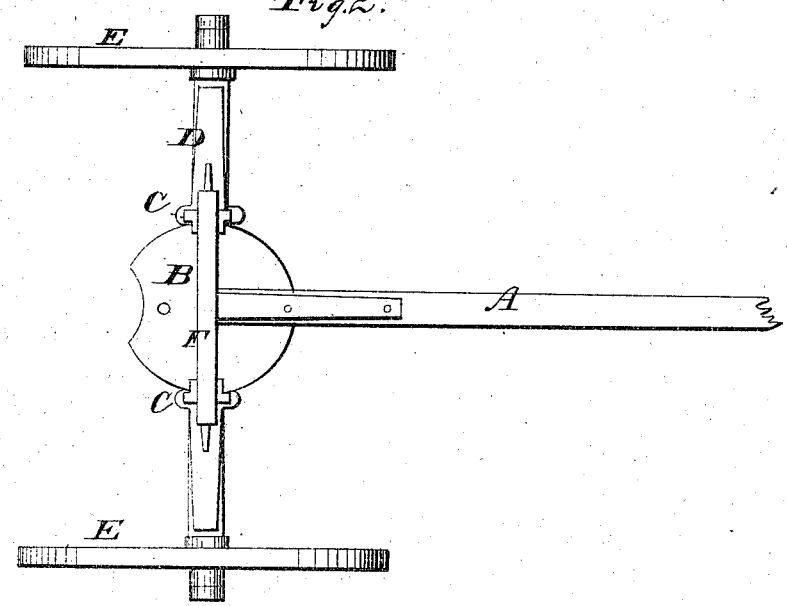

United States Patent Office.

EDMUND YEISER, OF SHERIDAN, PENNSYLVANIA.

*Letters Patent No. 81,452, dated August 25, 1868.*

IMPROVEMENT IN FIFTH-WHEEL FOR CARRIAGES.

The Schedule referred to in these Letters Patent and making part of the same.

TO ALL WHOM IT MAY CONCERN:

Be it known that I, EDMUND YEISER, of Sheridan, in the county of Lebanon, and State of Pennsylvania, have invented certain new and useful Improvements in Fifth-Wheel for Vehicles; and I do hereby declare that the following is a full, clear, and exact description thereof, reference being had to the accompanying drawings, and to the letters of reference marked thereon, which form a part of this specification, in which—

Figure 1 represents a side elevation, with one of the wheels removed, and

Figure 2 a plan view of my invention.

The nature of my invention consists in the combination and arrangement of certain devices, the peculiarities of which will be seen hereinafter.

To enable others to enjoy the benefits of my invention, I will now describe its construction and operation.

In the accompanying drawings—

A represents the tongue of a vehicle, to the under-side rear end of which is secured the perch-plate B.

D represents the front axle, on which the guides C are secured. The guides are curved on their inner upper surfaces to the same radius as the fifth-wheel B, which bears against them.

A bar, A', is attached to the under side of the tongue, and is bent downwards to pass beneath the axle, being connected with the perch-plate by means of metal rods or bars, H, acting as a support for said wheel. The tongue is pivoted to the front axle by the pin G, which passes through the fifth-wheel B, axle D, and partly through the plate or bar A'.

E E are the wheels and F the front spring.

It will be observed that the tongue can be turned readily in either direction around the pin G, the fifth-wheel bearing in or against the guides C C, thus affording a convenient and safe arrangement for changing the line of draught of the vehicle.

What I claim as new, and desire to secure by Letters Patent, is—

The perch-plate B, as constructed, in combination with pin g, guides C C, axle D, bar A', and supports H H, arranged substantially as set forth.

In testimony that I claim the foregoing as my own, I affix my signature in presence of two witnesses.

EDMUND YEISER.

Witnesses:
ISRAEL GARRETT,
ISAAC BETTS.